July 18, 1967    W. G. LIVEZEY    3,331,476
WEAR ADJUSTER

Filed Jan. 25, 1965    5 Sheets-Sheet 1

INVENTOR.
William G. Livezey
BY
ATTORNEY

July 18, 1967 W. G. LIVEZEY 3,331,476
WEAR ADJUSTER

Filed Jan. 25, 1965 5 Sheets-Sheet 3

INVENTOR.
William G. Livezey
BY
a. m. Heiter
ATTORNEY

July 18, 1967 W. G. LIVEZEY 3,331,476
WEAR ADJUSTER
Filed Jan. 25, 1965 5 Sheets-Sheet 4

INVENTOR.
William G. Livezey
BY
a. m. Heiter
ATTORNEY

__United States Patent Office__  3,331,476
Patented July 18, 1967

---

3,331,476
WEAR ADJUSTER
William G. Livezey, Indianapolis, Ind., assignor to General Motors Corporation, Detroit, Mich., a corporation of Delaware
Filed Jan. 25, 1965, Ser. No. 427,731
28 Claims. (Cl. 188—196)

This invention relates to wear adjusters and more particularly to a wear adjuster for automatically adjusting the engagement stroke of a friction engaging device to compensate for wear.

Unless the wear in a friction engaging device is compensated for, the running clearance will increase requiring a longer engagement stroke which is undesirable. While the wear adjusters of the prior art have proven generally satisfactory, they often do not meet the required standards of accurate wear compensation, versatility of application and simplicity and compactness of structure all tailored to economical production. These standards are often prescribed, for example, in the friction drive establishing devices of transmissions.

The principle of this invention lies in the provision of a wear adjuster having operating means responsive to overtravel of a friction engaging device's engaging means as the result of wear to automatically adjust the engaging means at device disengagement to compensate for the wear prior to subsequent device engagement. For example, in one illustrative application of this wear adjuster, the friction engaging device is in a transmission power train and is a multiple disc type device. This device has a cam ring or piston which when mechanically rotated follows a spiral path through the action of a ball ramp construction to engage the disc pack and when hydraulically actuated follows a straight path for disc pack engagement. Rotation of the piston for brake engagement is accomplished through mechanical linkage comprising a controlling cam assembly whose follower is threadably secured to the piston and establishes the retracted piston position to provide a selected running clearance.

The wear adjuster effects adjustment in the linkage to compensate for wear by controlled change of the geometrical relationship between the control end and controlled ends of the linkage. This is accomplished by a spring clutch assemly which controls adjustment of the cam follower in its threaded connection with the piston. This spring clutch assembly provides one-way clutching action which clutches the cam follower to a lever whose swing is correlated to overtravel of the piston resulting from wear in the disc pack. During engagement, the one-way clutch is disengaged so that the lever is free to swing with respect to the follower. Then at disengagement, the one-way clutch engages so that the lever rotates the cam follower to convert the overtravel of the piston into compensating adjustments in the cam assembly to restore the selected running clearance. Advancement of the piston may also be accomplished hydraulically and again the one-way clutch of the wear adjuster operates to compensate for wear to restore the selected running clearance.

An object of this invention is to provide in a friction engaging device, a wear adjuster responsive to overtravel during the engaging stroke to automatically adjust during disengagement to maintain the engaging stroke to compensate for wear and restore a selected running clearance.

Another object of this invention is to provide in a mechanical operating linkage of a friction engaging device, a wear adjuster operable to automatically adjust the geometry of the linkage to compensate for wear.

Another object of this invention is to provide a wear adjuster having clutch means responsive to the engagement stroke of a friction engaging device to adjust the device during disengagement to compensate for any wear that has occurred to restore a selected running clearance.

Another object of this invention is to provide in the mechanical operating linkage of a friction engaging device, a wear adjuster operable at device disengagement to automatically adjust the geometrical relationship between the control and controlled ends of the linkage to restore a selected running clearance whenever there is overtravel of the controlled end as the result of wear.

Another object of this invention is to provide in a friction engaging device, a wear adjuster including a one-way engaging device which engages only during friction device is engagement to convert any overtravel of the friction engaging device's apply means into adjustment in the device to maintain the engaging stroke constant to compensate for wear so that a selected running clearance of the friction device is always maintained.

Another object of this invention is to provide in a friction engaging device having engaging means selectively operated hydraulically and mechanically, a wear adjuster responsive to overtravel of the engaging means as the result of wear to adjust the engaging means during the retraction stroke to compensate for wear so that a selected running clearance is always maintained.

These and other objects of the invention will be more apparent from the following description and drawing of the preferred embodiments of the invention in which.

Figure 1:
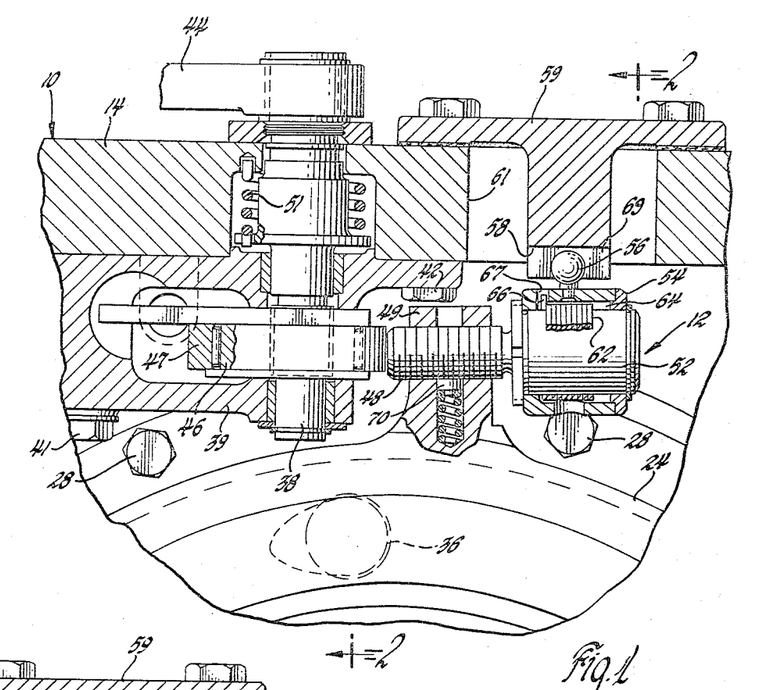
FIGURE 1 is a partial transverse view with parts in section showing one embodiment of a wear adjuster constructed according to this invention employed in a transmission brake assembly.

The embodiment of the invention in FIGURE 1 is illustrated in a transmission 10 having in its power train a friction drive establishing device which is the brake assembly generally designated at 12. The brake assembly 12 of which only the upper half is shown is housed by the transmission housing 14 and when engaged brakes a rotatably mounted hub 16 of the transmission power train by grounding this hub to the transmission housing.

The brake assembly comprises a plurality of friction plates or discs 18 having alternate plates splined at their inner radius to hub 16 and intermediate plates splined at their outer radius to a drum 20 integral with a web of the transmission housing. The plates are sandwiched between a thrust plate 21 and a pressure plate 22. Thrust plate 21 is splined at its outer radius to drum 20 and retained thereon against the forces of brake engagement by suitable retaining means, not shown. Pressure plate 22 is also splined at its outer radius to drum 20 and is free to advance to pack the disc pack to ground hub 16 to the housing.

Advancement of pressure plate 22 for brake engagement is accomplished by a motor assembly comprising an external annular piston 24 received in sealing engagement on a fixed internal annular cylinder 26 which is rigidly secured by bolts 28 to a support member 29 of the transmission housing. Movement of the engaging means provided by the piston 24 to advance the non-rotatable pressure plate 22 for brake engagement is accomplished either hydraulically or mechanically depending on the type of braking desired.

The piston 24 is advanced hydraulically when fluid under pressure from any suitable source is supplied via line 31 to the motor chamber 32. On exhaust of the motor chamber, retraction springs 34 compressed between drum 20 and piston 24 retract the piston for disengagement.

The piston 24 when advanced mechanically operates as a cam with both the piston and cylinder having contiguous annular surfaces having a plurality of circumferentially spaced mating ball ramps and balls 36. The ball ramps and balls 36 provide a fixed axis of rotation for piston 24 and when the piston is rotated clockwise, as viewed in FIGURE 1, it travels a spiral path about and along this axis being advanced for brake engagement by the ball ramps and balls 36 which provide the engagement force.

Rotation of piston 24 is by a mechanical linkage assembly comprising a brake operating shaft 38 rotatably supported and fixed against axial movement in an antifriction bearing block assembly 39 which is rigidly secured to the upper internal wall of the transmission housing by bolts 41 and 42. Shaft 38 is controlled from a remote position by the control end of connecting linkage of which only the link 44 is shown which is rigidly connected to the upper end of shaft 38 which extends through an accommodating aperture provided in the transmission housing.

A cylindrical cam 46 of a cam roller assembly is splined eccentrically to shaft 38 at a point near its lower end, the cam roller assembly being accommodated by bearing block assembly 39. Cam 46 rotates relative to its cam roller 47 on cylindrical roller bearings and cam roller 47 engages a cam follower 48 which is threaded into a lug 49 integral with piston 24. Piston 24 is normally held in its retracted position which is determined by the cam follower and roller engagement as shown in FIGURE 1 through the action of retraction springs 34 and ball ramps and balls 36. This retracted piston position determines the running clearance desired for the brake.

Brake engagement is thus obtained mechanically by swinging link 44 to rotate shaft 38 and connected cam 46 which acts through the engaged cam roller and follower to rotate piston 24 clockwise as viewed in FIGURE 1. On the release of the apply force acting on link 44, a torsion retraction spring 51 which has one end held by shaft 38 and the other end held by housing 14 and which has been torqued up during brake engagement, unwinds to rotate shaft 38 and connected cam 46 to its low or retracted position. At the same time, the piston retraction springs 34 acting through ball ramps and balls 36 cause counterclockwise rotation of piston 24 to maintain engagement of cam follower 48 with the retracting cam roller 47.

The wear or brake adjuster assembly now to be described effects brake adjustment to compensate for wear in the disc pack by changing the geometrical relationship between the control and controlled ends of the operating linkage, the controlled end being at the piston 24. This is accomplished by angular advancement of piston 24 on its ball ramps and balls 36 through adjustment of cam follower 48 in its threaded engagement with piston lug 49. For example, the threaded advancement of cam follower 48 in piston lug 49 and in the direction of cam 46 will rotate piston 24 clockwise as viewed in FIGURE 1 resulting in advancement of piston 24 in the direction of the disc pack as viewed in FIGURE 2 to compensate for disc pack wear as will be described below.

The threaded portion of cam follower 48 is provided with a left-hand thread which will advance cam follower 48 in the direction of cam 46 upon counterclockwise rotation of the cam follower as viewed in FIGURE 1. Cam follower 48 is also provided with a cylindrical drum surface 52 and retains a sleeve assembly 54 which is rotatably supported on the drum surface and has a lever provided by a spherical knob or ball 56 received within a control groove 58 provided in a transmission cover plate 59. Cover plate 59 also serves to close an aperture 61 in housing 14 through which the wear adjuster assembly is inserted at transmission assembly.

A left-hand wrapped spiral clutch spring 62 normally frictionally engages drum surface 52 and is freely accommodated in an annular space 64 provided by sleeve assembly 54. The left end of clutch spring 62 as viewed in FIGURE 1 provides a tang 66 extending radially outward received in a radial bore 67 in sleeve assembly 54. Clockwise rotation of sleeve assembly 54 with respect to the follower's drum surface 52, as viewed in FIGURE 2, will thus engage tang 66 to expand the left-hand spiral clutch spring and release its friction engagement with the drum surface. This permits freedom of rotational movement between sleeve assembly 54 and cam follower 48. If on the other hand the sleeve assembly 54 is rotated counterclockwise, as viewed in FIGURE 2, the spiral clutch spring 62 wraps down with the aid of its friction engagement on drum surface 52 clutching cam follower 48 to sleeve assembly 54 for conjoint rotation. In an actual construction, for example, 0.030 inch counterclockwise movement of sleeve assembly 54 about drum surface 52 (measured at the radius of sleeve and tang engagement) is sufficient travel to fully engage this one-way clutch engaging device.

Figure 2:
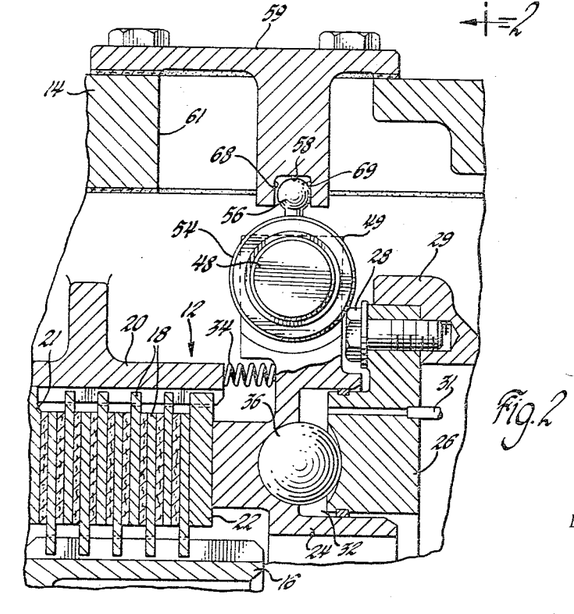
FIGURE 2 is a view taken substantially on the line 2—2 in FIGURE 1.

The groove walls 68 and 69 of groove 58 extend at right angles to the piston axis and with the piston in its retracted position, ball 56 contacts groove wall 69 as viewed in FIGURE 2. The space between ball 56 and the opposite groove wall 68 in this position is by design made equal to the desired running clearance minus the travel required to engage clutch spring 62, for example, the 0.030 inch figure stated above. Thus, so long as no appreciable wear occurs in the disc pack, ball 56 moves fore and aft as viewed in FIGURE 2 without causing a fixed change in the angular relationship between sleeve assembly 54 and cam follower 48.

If appreciable wear does occur in the disc pack during brake engagement, ball 56 by its contact with groove wall 68 causes sleeve assembly 54 to rotate clockwise and since clutch spring 62 expands during such operation, sleeve assembly 54 rotates freely about drum surface 52 and by an amount correlated to the travel eventually required to engage clutch spring 62 and also the overtravel of piston 24 as a result of brake wear. Then on the return stroke of piston 24 by retraction springs 34, ball 56 contacts opposite groove wall 69 with clutch spring 62 clutching cam follower 48 to sleeve assembly 54. By design, the resulting torque provided by retraction springs 34 acting to rotate sleeve assembly 54 counterclockwise is greater than the frictional torque tending to prevent counterclockwise rotation of cam follower 48 in its threaded engagement with piston lug 49. Thus, the cam follower 48 is caused to be rotated counterclockwise and is advanced by its threaded engagement in piston lug 49 a distance determined by the lead of this threaded connection which is calculated to provide the desired angular and thus axial advancement of piston 24 to adjust for the wear. As cam follower 48 advances it carries along the sleeve assembly 54 with ball 56 permitting such movement through sliding contact with groove wall 69. In this manner overtravel of piston 24 is converted to automatic adjustment of the piston engagement stroke with clutch spring 62 providing ratchet-like action so that the selected running clearance is automatically maintained. Since piston overtravel in the axial piston direction only is utilized by this wear adjuster to compensate for wear, this wear adjuster will automatically compensate for brake wear when the piston is operated hydraulically by the fluid motor equally as well as when the piston is operated by the mechanical linkage. Another feature of this wear adjuster is that adjustment is made only on piston return from apply when the threaded cam member 48 is not axially loaded by the apply forces in the linkage.

Preferably, the amount of adjustment over any increment of wear upon a single brake apply is made to compensate for less than the actual wear. This is sufficient since there will be enough adjusting cycles during light brake duty, no wear braking operation to compensate for the less than full adjustment on each brake apply. A spring loaded snubber button 70 mounted in piston lug 49 maintains a friction drag on the threaded portion of cam follower 48 to prevent the cam follower from vibrating out of adjustment.

Figures 3, 4, 5:
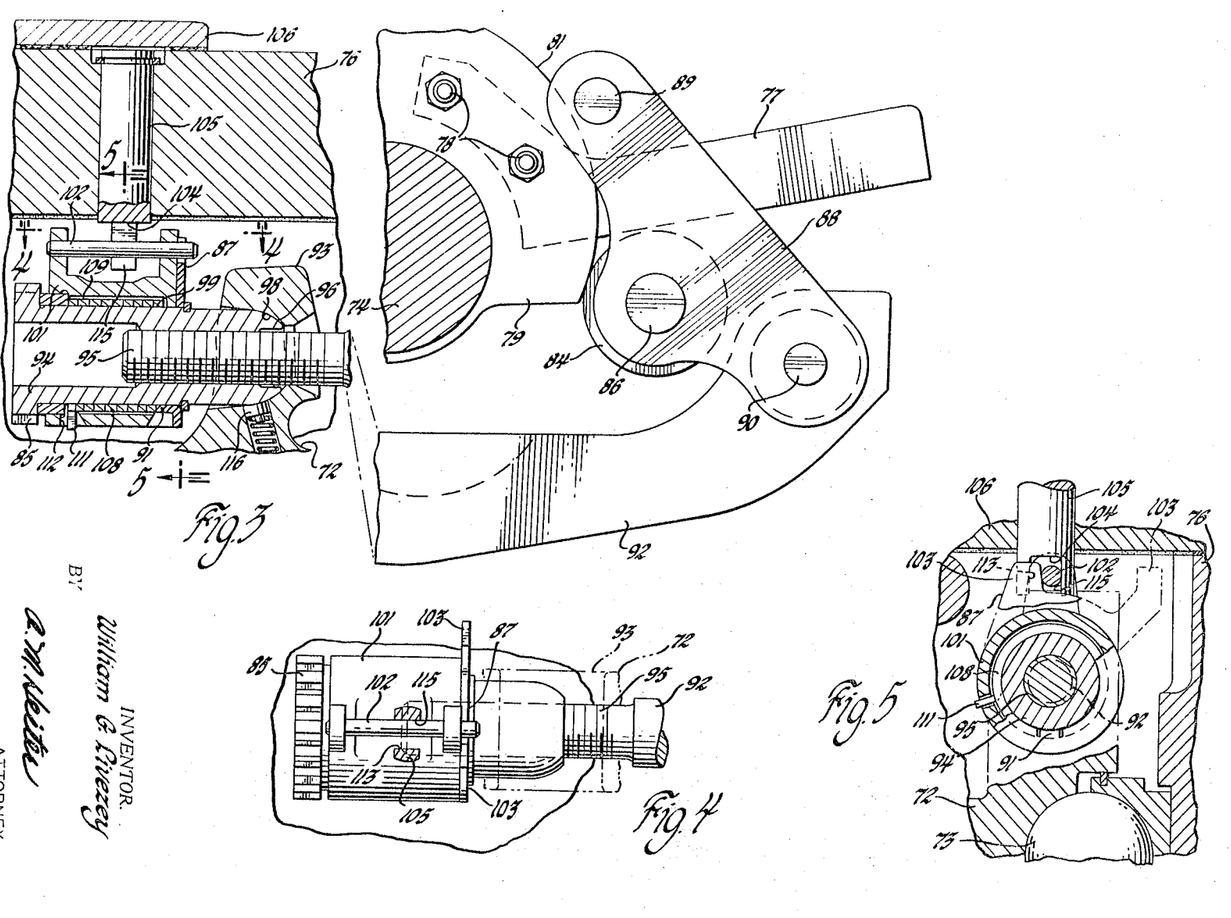
FIGURE 3 is a partial transverse view with parts in section showing a second embodiment of a wear adjuster constructed according to this invention employed in a transmission brake assembly.
FIGURE 4 is a view taken substantially on the line 4—4 in FIGURE 3.
FIGURE 5 is a view taken substantially on the line 5—5 in FIGURE 3.

In the brake assembly shown in FIGURE 3, the brake apply piston 72 is advanced for brake engagement hydraulically like piston 24 of the FIGURE 1 brake assembly. Piston 72 also has ball ramps and balls 73 like the FIGURE 1 brake assembly for mechanical brake engagement and is operated by the mechanical linkage comprising a shaft 74 suitably supported for rotation by the transmission housing 76. A link 77 is connected by bolts 78 to a cam 79 rigidly secured to shaft 74 and is controlled from a remote position to rotate shaft 74 and connected cam 79 for brake engagement. Cam 79 has a cam surface 81 which contacts a cam roller 84 rotatably supported by a pin 86 on a lever arm 88 which is pivoted at one end by a pin 89 to the transmission housing. Lever arm 88 is pivotally secured at its opposite end by a pin 90 to one end of a brake apply arm 92. The other end of arm 92 is connected to the lug 93 of piston 72 by a brake adjusting nut 94 which threadably engages a threaded portion 95 of the arm and has a spherical head 96 received in an accommodating socket 98 in lug 93.

To apply the brake, link 77 is swung to rotate shaft 74 and connected cam 79 in the clockwise direction as viewed in FIGURE 3. Cam surface 81 through its contact with cam roller 84 then pivots the lever arm 88 counterclockwise about pin 89 resulting in slight swinging movement of connected arm 92 and pulling of this arm rightwardly. The socket connection of arm 92 with lug 93 permits this swinging arm movement and piston 72 is rotated clockwise to advance on its ball ramps and balls for brake engagement. At disengagement, the apply force acting on link 77 is released and a torsion spring, not shown, like spring 51 shown in the FIGURE 1 brake assembly, returns this shaft to its disengaged or retracted position while at the same time piston retraction springs, not shown, like the retraction springs 34 of the FIGURE 1 brake assembly, urge piston 72 in the counterclockwise direction for retraction and maintain contact in the piston's ball and socket connection with arm 92.

The brake adjuster effects brake adjustment to compensate for wear in the disc pack by changing the geometrical relationship in the linkage between arm 92 and piston 72 through advancement of nut 94 on the threaded arm portion 95. For example, advancement of nut 94 in the direction of piston lug 93 will also advance piston 72 angularly in the clockwise engaging direction as viewed in FIGURE 3.

The threaded arm portion 95 and nut 94 are provided with a righthand lead which will advance the nut 94 in the direction of the piston lug 93 upon counterclockwise nut rotation as viewed in FIGURE 5. Nut 94 has a cylindrical drum surface 99 and retains a sleeve assembly 101 which is rotatably supported on this drum surface and has a pair of spaced ears which carry a rod 102 extending at right angles to the piston axis. Rod 102 is received in a groove 104 of a pin 105 retained in an accommodating bore in housing 76 by a cover plate 106, groove 104 also extending at right angles to the piston axis. A left-hand spiral clutch spring 108 normally in frictional engagement with drum surface 99 is accommodated freely in an annular space 109 provided in sleeve assembly 101. Clutch spring 108 at its left end, as viewed in FIGURE 3, has a tang 111 fitted in an aperture 112 in sleeve assembly 101.

Clockwise rotation of sleeve assembly 101 with respect to nut 94, as viewed in FIGURE 5, will engage spring tang 111 to expand the left-hand spiral clutch spring 108 releasing its frictional engagement with drum surface 99. This permits freedom of rotational movement between sleeve assembly 101 and nut 94. If, on the other hand, sleeve assembly 101 is rotated counterclockwise, as viewed in FIGURE 5, the spiral clutch spring 108 wraps down on drum surface 99 clutching the nut 94 to sleeve assembly 101.

So long as no appreciable wear occurs in the disc pack, rod 102 operates within groove 104 without causing a fixed change in the angular relationship between sleeve assembly 101 and nut 94, the space between rod 102 and the groove wall 113 when the brake is disengaged and the rod 102 contacts the opposite groove wall 115 equaling the desired brake clearance minus the travel required to engage the spring clutch. If appreciable wear occurs, rod 102 by its contact with groove wall 113 requires the sleeve assembly 101 to rotate clockwise and since clutch spring 108 expands during such operation sleeve assembly 101 rotates freely about nut 94 in the clockwise direction for wear correlation. Upon the piston return stroke, rod 102 contacts the opposite groove wall 115 with the clutch spring locking the sleeve assembly 101 to the drum surface 99. The resulting force provided by the piston retraction springs acting to rotate the sleeve assembly 101 counterclockwise is greater than the frictional torque tending to hold the nut 94 against advancement on the threaded arm portion 95. Thus, the nut 94 is caused to be advanced rightwardly on the threaded arm portion 95 as viewed in FIGURE 3 and converts the piston overtravel into piston advancement at brake release to maintain the selected running clearance. Sleeve assembly 101 advancement with the nut 94 is permitted through sliding contact between rod 102 and groove wall 115. A spring-loaded friction snubber 116 mounted in piston lug 93 frictionally engages the spherical nut head 96 to hold nut 94 in its adjusted position against transmission vibration. This brake adjuster embodiment, like the FIGURE 1 brake adjuster, since it relies only on piston overtravel in the axial direction for brake adjustment also operates equally as well to effect brake adjustment when the brake is applied hydraulically.

The nut 94 is knurled at 85 for manual adjustment of the nut. In addition manual wear adjustment at initial assembly is facilitated by providing in the wear adjuster assembly a plate 87 which is apertured for reception on drum surface 99. This plate which is retained on the nut has a tab 91 arranged to be engaged by the right-hand end of clutch spring 108 as viewed in FIGURE 3. Plate 87 has spaced ears 103 between which one end of rod 102 extends for general plate location and these ears will engage internal walls of the transmission housing under the conditions now to be described. At wear adjuster assembly and before finally inserting grooved pin 105 a suitable tool is inserted through the aperture for pin 105 which will accomplish rotation of the nut. As nut 94 is turned in either direction one of the ears 103 will engage the transmission housing and the clutch spring 108 through engagement with plate tab 91 will be expanded to loosen the nut for adjustment. The plate 87 floats on drum surface 99 so as not to affect clutch spring action during automatic wear adjustment.

Figure 6:
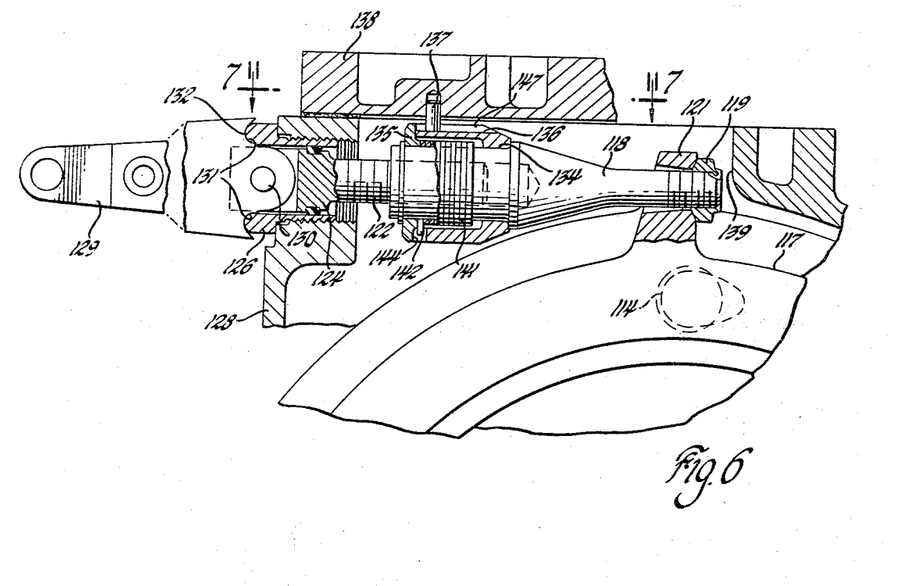
FIGURE 6 is a partial transverse view with parts in section showing a third embodiment of a wear adjuster constructed according to this invention employed in a transmission brake assembly.
Figure 7:
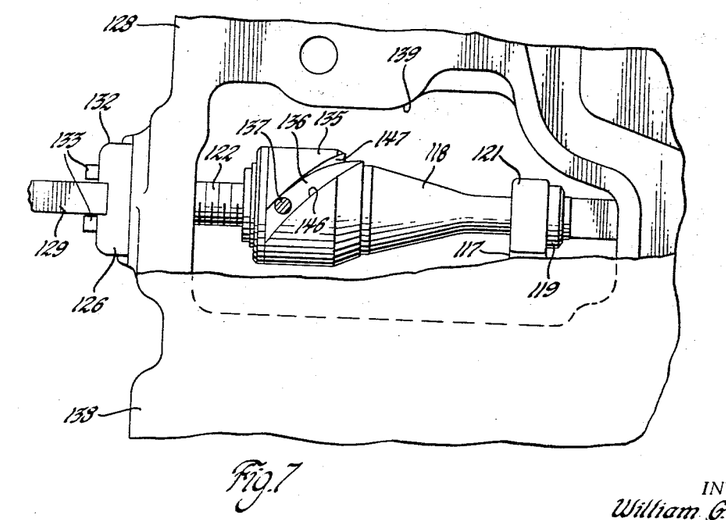
FIGURE 7 is a view taken substantially on the line 7—7 in FIGURE 6.

The brake assembly in FIGURE 6 has its brake apply piston 117 advanced for brake engagement hydraulically like piston 24 of the FIGURE 1 assembly. The piston 117 also has ball ramps and balls 114 like the FIGURE 1 assembly for mechanical brake engagement and is operated by the mechanical linkage which comprises an arm 118. Arm 118 applies an applying force by engagement of its threaded nut 119 with piston lug 121, brake engagement in this instance being effected by counter-clockwise piston rotation as viewed in FIGURE 6. Arm 118 is threadably secured to the threaded portion 122 of a piston link 124 which is slidable in a cylinder 126 threadably secured to the transmission housing 128 and prevented from rotation by the external linkage. A lever arm 129 which is connectible to be controlled from a remote position is pivotally secured to piston link 124 by a pin connection 130 and has sockets 131 engaging the annular lipped end 132 of cylinder 126.

Brake engagement is effected by swinging lever arm 129 in the vertical plane and in either direction which through one of the socket lip pivots causes piston link 124 to move leftwardly as viewed in FIGURE 6 to rotate piston 117 for brake engagement. Stops 133 provided on the lipped end of cylinder 126 engage arm 129 to prevent rotation of connected piston link 122 in the cylinder.

The brake adjuster effects brake adjustment to compensate for wear in the disc pack by changing the geometrical relationship between piston link 124 and brake apply arm 118 through adjustment of the threaded connection therebetween. For example, the advancement of arm 118 in the direction of piston link 124 will rotate piston 117 counterclockwise and advance piston 117 in the direction of the disc pack.

Threaded piston link portion 122 and arm 118 are provided with a right-hand lead so that arm 118 will advance in the leftward direction upon right-hand arm 118 rotation as viewed from the right end of FIGURE 6. Arm 118 has a cylindrical drum surface 134 and retains a sleeve assembly 135 which is rotatably supported on this drum surface and has a left-hand lead helical groove 136 which receives a pin 137. Pin 137 is press fitted in a cover member 138 which is rigidly secured to the transmission housing and closes the housing aperture 139 through which the wear adjuster assembly is easily inserted. A right-hand spiral clutch spring 141 normally frictionally engages drum surface 134 and is provided at its left-hand end with a tang 142 received in an accommodating aperture 144 in the sleeve assembly 135.

Left-hand rotation of sleeve assembly 135 with respect to arm 118 as viewed from the right end of FIGURE 6 will engage tang 142 with sleeve assembly 135 to expand clutch spring 141. This permits freedom of rotational movement between sleeve assembly 135 and arm 118. If, on the other hand, sleeve assembly 135 is rotated in the right-hand direction in this same viewing, clutch spring 141 wraps down on drum surface 134 clutching the sleeve assembly 135 to arm 118.

The diameter of pin 137 and the width of helical groove 136 are selected so that when no appreciable wear occurs in the disc pack, pin 137 operates in helical groove 136 without causing a fixed change in the angular relationship between sleeve assembly 135 and arm 118 through operation of the spring clutch. If appreciable wear occurs, groove wall 146 by its contact with pin 137 requires sleeve assembly 135 to rotate in the left-hand direction as viewed from the right end of FIGURE 6 and since the clutch spring expands during such operation, sleeve assembly 135 rotates freely about drum surface 134 for wear correlation. Upon the return stroke of piston 117, the opposite side wall 147 contacts pin 137 with the clutch spring 141 engaged and sleeve assembly 135 and clutched arm 118 are rotated in the opposite or right-hand direction. Arm 118 is capable of rotation relative to piston lug 121 by virtue of the spherically seated nut 119 staked to arm 118 and thus advances leftwardly on the nonrotatable threaded portion 122 pulling along piston 117 to convert piston overtravel into piston advancement for wear compensation at brake release. In this instance full wear compensation is available at release after mechanical brake apply and partial wear compensation at release after hydraulic apply recognizing that there is both angular and axial piston movement during mechanical apply and only axial piston movement during hydraulic apply to operate the controlling pin and helical groove for the spring clutch.

Figure 8:
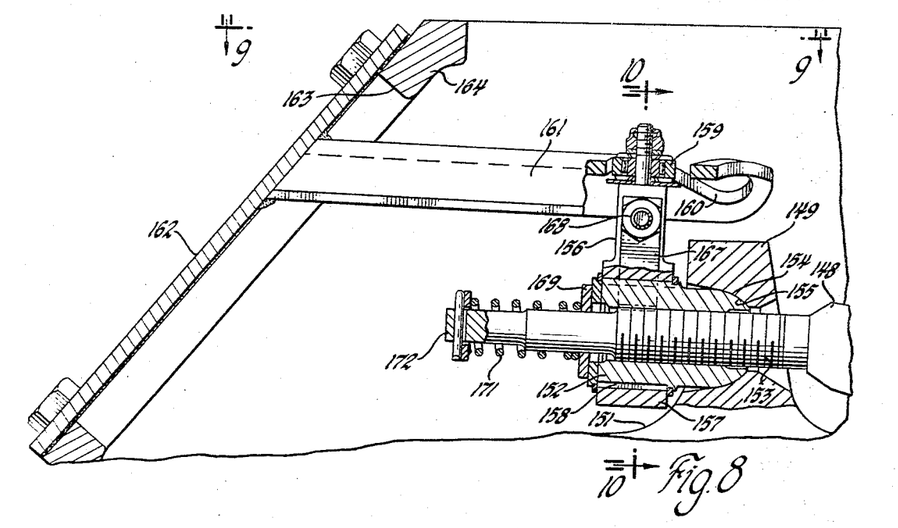
FIGURE 8 is a partial transverse view with parts in section showing a fourth embodiment of a wear adjuster constructed according to this invention employed in a transmission brake assembly.
Figure 9:
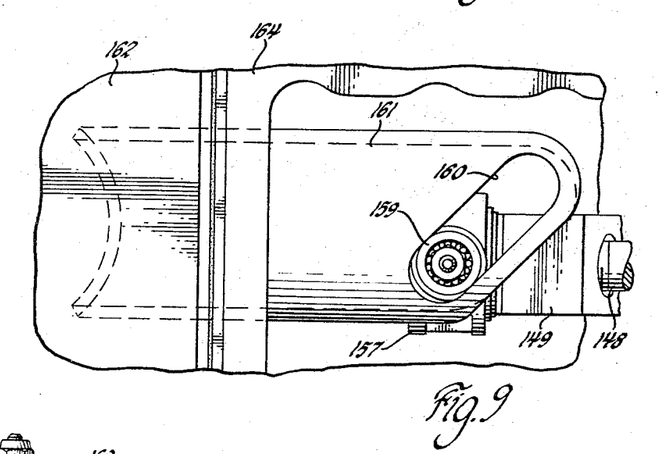
FIGURE 9 is a view taken substantially on the line 9—9 in FIGURE 8.

In FIGURE 8, the brake assembly has brake apply arm 148 connected to the lug 149 of the brake apply piston 151 by a brake adjusting nut 152. Nut 152 is received by the threaded arm portion 153 and has a spherical end 154 received by the lug socket 155 so that when arm 148 is pulled rightwardly the piston 151 is rotated clockwise to advance in the direction of the disc pack on ball ramps and balls, not shown, like piston 24 of the FIGURE 1 assembly.

Wear adjustment is provided by the wear adjuster assembly which has a follower arm 156 whose integral collar 157 is retained on nut 152 and is rotatable about ratchet teeth 158 formed on a peripheral portion of the nut. Follower arm 156 supports through antifriction bearings a cam roller 159 which is arranged to follow the spiral cam surface provided by a left-hand lead spiral slot 160 provided in curved bracket 161. Bracket 161 is welded to a cover 162 which closes an aperture 163 of housing 164 through which the wear adjuster is installed without disassembly of the transmission's power train.

Figure 10:
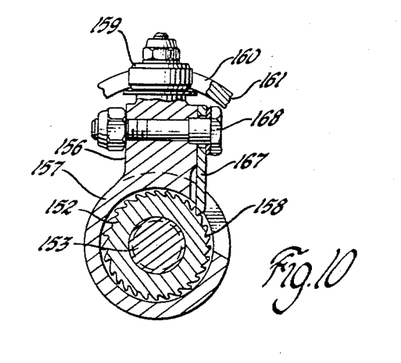
FIGURE 10 is a view taken substantially on the line 10—10 in FIGURE 8.

During mechanical brake engagement, as arm 148 moves rightwardly to pull piston 151 for advancement, roller 159 follows slot 160 rotating follower 156 counterclockwise as viewed in FIGURE 10 as the brake running clearance is taken up. Provided no appreciable wear occurs, the relative rotation between follower 156 and ratchet teeth 158 is not sufficient to permit a spring pawl 167, extending through an aperture in collar 157 and secured in cantilever manner by bolt 168 to arm 156, to slide into engagement with another tooth of the ratchet. Thus, the relationship between brake adjusting nut 152 and follower arm 156 is maintained when the brake is disengaged so that nut 152 does not turn on threaded arm portion 153. If, during the brake engagement, appreciable wear occurs in the disc pack, pawl 167 of this one-way engaging device will pick up one or more of the next ratchet teeth as follower arm 156 is caused to rotate by virtue of the roller cam action. Then when the brake is released, brake adjusting nut 152 which has a right-hand threaded connection with the threaded arm portion 153 will be advanced on the threaded portion and rightwardly to rotate piston 151 clockwise as viewed in FIGURE 8 resulting in piston advancement on the ball ramps and balls to compensate for brake wear. A washer 169 loaded by a spring 171 held on an extension 172 of arm 148 provides a frictional holding force to prevent the adjusting nut from vibrating out of adjustment.

The piston 151 may also be operated hydraulically like the FIGURE 1 piston and again adjustment for wear will occur when pawl 167 is caused to pick up one or more ratchet teeth recognizing that under these conditions the piston will move axially only and roller 159 will not move longitudinally relative to the slot 160 while follower arm 156 rotates counterclockwise during brake apply and clockwise at brake release.

Figure 11:
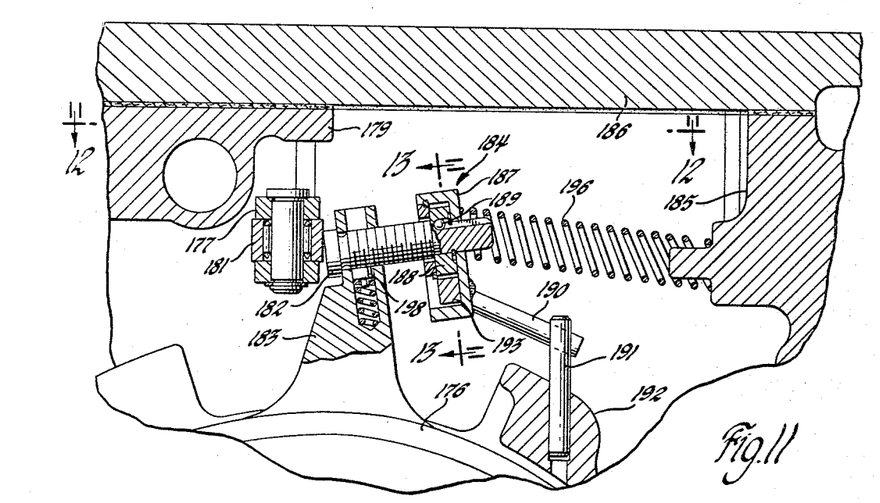
FIGURE 11 is a partial transverse view with parts in section showing a fifth embodiment of a wear adjuster constructed according to this invention employed in a transmission brake assembly.
Figure 12:
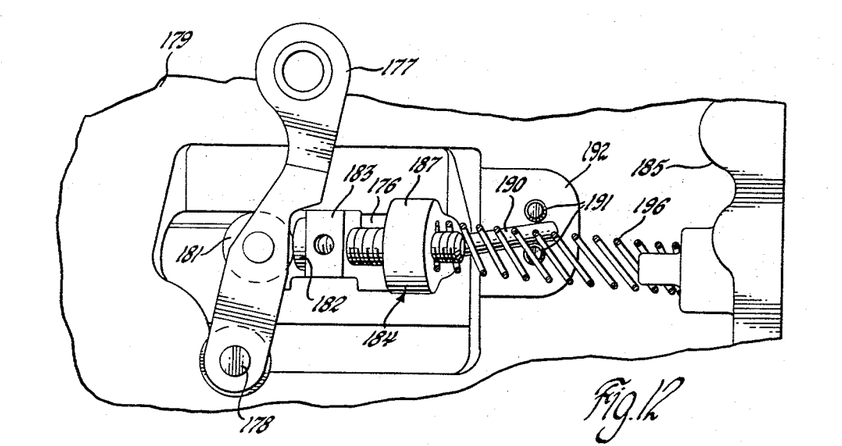
FIGURE 12 is a view taken substantially on the line 12—12 in FIGURE 11.

Referring to the brake assembly shown in FIGURE 11, piston 176 is advanced hydraulically for brake engagement like piston 24 of the FIGURE 1 assembly. Piston 176 also has ball ramps and balls like the FIGURE 1 assembly for mechanical brake engagement and is operated by the mechanical linkage comprising a lever arm 177 which is pivoted by a pin 178 to the transmission housing 179 and is connectible to be controlled from a remote position for swinging movement about this pivot pin. Lever arm 177 has a roller cam assembly having a cam roller 181 which contacts a cam follower 182 threadably secured to the piston lug 183. Thus, when lever arm 177 is caused to swing clockwise as viewed in FIGURE 12, roller 181 through its contact with follower 182 rotates piston 176 clockwise as viewed in FIGURE 11 to apply the brake. The wear adjuster mechanism 184 which is inserted through a housing aperture 185 closed by a cover 186 effects brake adjustment to compensate for wear by advancing threaded follower 182 in the direction of roller 181 through one-way engaging action so that piston 176 is advanced in the disc pack direction for wear adjustment and only during the disengagement stroke.

Figure 13:
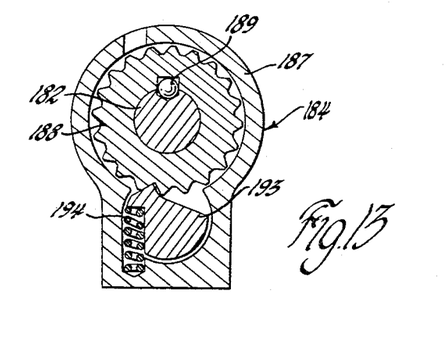
FIGURE 13 is a view taken substantially on the line 13—13 in FIGURE 11.

Cam follower 182 is provided in its lug connection with a right-hand thread which will advance the follower in the direction of cam roller 181 upon colckwise rotation of the follower as viewed in FIGURE 13. Should appreciable wear occur, this advancement is accomplished by a one-way engaging ratchet mechanism comprising a ratchet housing member 187 which is rotatably supported on follower 182 and houses a ratchet 188 which is keyed to follower 182 by the ball and keyways 189. A torque arm provided by pin 190 is rigidly secured at one end such as by welding to ratchet housing 187 and at the opposite end is sandwiched between a pair of dowel pins 191 pinned to a fixed member 192 of the transmission housing. The ratchet 188 is engaged by a pawl 193 loaded by a spring 194, the pawl having a spherical sector accommodated by ratchet housing 187 to provide for pawl rotation. A spring 196 compressed between housing 179 and ratchet housing 187 holds member 187 on the follower 182 and also aids engagement between follower 182 and roller 181.

During brake engagement as piston 176 is urged to engage the disc pack, the torque arm 190 is guided between pins 191 and forces ratchet housing 187 to revolve in the counterclockwise direction about ratchet 188 as viewed in FIGURE 13, ratchet 188 translating without rotation with the piston. If the ratchet housing rotation is sufficient to pick up one or more of the next teeth as will occur when appreciable brake wear occurs adjustment will be made during the brake release stroke. This is provided by the pawl 193 which will hold the rotational advancement of the ratchet housing 187 on ratchet 188 so that as the brake is disengaged, ratchet 188 will rotate the connected follower 182 clockwise as viewed in FIGURE 13 for advancement. Free movement of the brake apply piston 176 is governed by the number of ratchet teeth and the angle of torque arm 190. A spring loaded snubber button 198 mounted in piston lug 183 maintains a friction drag on the threaded portion of follower 182 to prevent the follower from vibrating out of adjustment.

Recognizing that wear adjustment will be effected both by axial and rotational apply movement of piston 176, brake wear compensation will be available through the ratcheting action whether apply piston 176 is operated hydraulically or mechanically.

The above-described preferred embodiments illustrate the wide spectrum of power train environments wherein the wear adjuster of this invention may be employed with a minimum sacrifice of rework of the power train components or the provision of large space accommodations. Furthermore, while this invention has been illustrated as being employed in the disc brake assembly of a transmission, it will be understood that this invention is also applicable to other similar brake assemblies and clutch assemblies for converting the overtravel of the friction engaging means into automatic wear compensation at disengagement.

The above-described preferred embodiments are illustrative of the invention which may be modified within the scope of the appended claims.

I claim:

1. In a friction engaging device the combination comprising,
  (a) engaging means urgeable through an engaging stroke to advance to engage the device and retractable to disengage the device, biasing means normally biasing said engaging means to disengage the device,
  (b) and wear adjuster means operatively associated with said biasing means for advancing said engaging means with the motive force of said biasing means to compensate for wear including one-way engaging means which senses engaging means overtravel during the engaging stroke occurring as a result of wear and engages only during device disengagement for converting the engaging means overtravel into wear compensating advancement of said engaging means for subsequent engaging strokes.

2. In a friction engaging device the combination comprising,
  (a) engaging means urgeable to advance to engage the device and retractable to disengage the device,
  (b) linkage means for urging said engaging means through a selected engaging stroke for device engagement, spring means acting on said linkage means for urging retraction of said engaging means,
  (c) and wear adjuster means for adjusting the geometrical relationship in said linkage means only during device disengagement and in response to engaging means overtravel during the engaging stroke as the result of wear employing said spring means to advance said engaging means to compensate for the wear.

3. In a friction engaging device the combination comprising,
  (a) engaging means urgeable through an engaging stroke to advance to engage the device and retractable to disengage the device,
  (b) fluid motor means for urging said engaging means through said engaging stroke, biasing means for urging retraction of said engaging means,
  (c) and wear adjuster means for converting engaging means overtravel during the engaging stroke occurring as a result of wear with the aid of said biasing means into advancement of said engaging means to compensate for the wear only during device disengagement.

4. In a friction engaging device the combination comprising,
  (a) an engaging member, means for enabling said engaging member to be revolved about an axis and for advancing said engaging member through an engaging stroke to engage the device when said engaging member is revolved in one direction, biasing means for revolving said engaging member in the opposite direction to disengage the device,
  (b) and wear adjuster means utilizing the motive force of said biasing means for revolving said engaging member in said one direction for advancement whenever wear occurs so that said engaging member is adjusted to compensate for the wear.

5. In a friction engaging device the combination comprising,
  (a) an engaging member, means for enabling said engaging member to be revolved about a fixed axis and for camming said engaging member through an engaging stroke and along said axis to engage the device when said engaging member is revolved, (b) and wear adjuster means responsive to an increased engaging stroke resulting from wear for revolving said engaging member during device disengagement to advance said engaging member to compensate for the wear.

6. In a friction engaging device the combination comprising,
  (a) an engaging member, means for enabling said engaging member to be revolved about an axis and for advancing said engaging member through an engaging stroke to engage the device when said engaging member is revolved,
  (b) linkage means for revolving said engaging member including cam means having a cam follower operatively connected to said engaging member,
  (c) and wear adjuster means for adjusting said cam follower to revolve said engaging member for advancement to compensate for wear only during device disengagement.

7. In a friction engaging device the combination comprising,
  (a) an engaging member, means for enabling said engaging member to be revolved about an axis and for advancing said engaging member through an engaging stroke to engage the device when said engaging member is revolved,
  (b) linkage means for revolving said engaging member including cam means having a cam follower threadably secured to said engaging member,
  (c) and wear adjuster means for adjusting said cam follower to revolve said engaging member for advancement to compensate for wear only during device disengagement, said wear adjuster means including one-way clutch means for releasing said cam follower during the engaging stroke while at the same time sensing overtravel of said engaging member as a result of wear and for engaging said cam follower at device disengagement to rotate said cam follower in its threaded engagement with said engaging member only during device disengagement so that the geometrical relationship in said linkage means is adjusted to effect the advancement of said engaging member to compensate for the wear.

8. The friction engaging device set forth in claim 7 and fluid motor means for advancing said engaging member through the engaging stroke.

9. The friction engaging device set forth in claim 7 and said one-way clutch means including sleeve means rotatably supported on said cam follower, a one-way acting clutch spring for clutching said cam follower to said sleeve means when said sleeve means is rotated in one direction only and means for rotating said sleeve means in a direction opposite said one direction when overtravel of said engaging member occurs during device engagement and in said one direction during subsequent device disengagement.

10. The friction engaging device set forth in claim 9 and said means for rotating said sleeve means including a grooved abutment member providing a groove extending transverse to said axis, another abutment member abuttable with said grooved abutment member in said groove, one of said abutment members being fixed against movement in the device and the other of said abutment members being connected to said sleeve means.

11. In a friction engaging device the combination comprising,
  (a) an engaging member, means for enabling said engaging member to be revolved about an axis and for advancing said engaging member through an engaging stroke to engage the device when said engaging member is revolved, a spring for retracting said engaging member,
  (b) linkage means for revolving said engaging member including an apply arm operatively threadably secured to said engaging member,
  (c) and wear adjuster means employing the motive force of said spring for adjusting the threaded relationship between said apply arm and said engaging member to revolve said engaging member for advancement to compensate for wear only during device disengagement.

12. In a friction engaging device the combination comprising,
  (a) an engaging member, means for enabling said engaging member to be revolved about an axis and for advancing said engaging member through an engaging stroke to engage the device when said engaging member is revolved, means for retracting said engaging member,
  (b) linkage means for revolving said engaging member including an apply arm threadably secured to a nut engaging said engaging member,
  (c) and wear adjuster means for turning said nut on said apply arm to revolve said engaging member for advancement to compensate for wear only during device disengagement, said wear adjuster means including one-way clutch means operatively associated with a stationary member, said nut and said engaging member for releasing said nut during the engaging stroke while at the same time sensing overtravel of said engaging member as a result of wear and for operatively connecting said nut to said stationary member at device disengagement to transmit the movement of said engaging member to turn said nut in its threaded engagement with said apply arm only during device disengagement so that the geometrical relationship in said linkage means is adjusted to effect the advancement of said engaging member to compensate for the wear.

13. The friction engaging device set forth in claim 12 and fluid motor means for advancing said engaging member through the engaging stroke.

14. The friction engaging device set forth in claim 12 and said one-way clutch means including sleeve means rotatably supported on said nut, a one-way acting clutch spring for clutching said nut to said sleeve means when said sleeve means is rotated in one direction only and said fixed member and said sleeve means having a lost motion connection for rotating said sleeve means in a direction opposite said one direction when overtravel of said engaging member occurs during device engagement and in said one direction during subsequent device disengagement.

15. The friction engaging device set forth in claim 14 and said lost motion connection having a groove extending transverse to the axis about which said engaging member is revolved and an abutment member abuttable with the sides of said groove.

16. In a friction engaging device the combination comprising,
  (a) an engaging member, means for enabling said engaging member to be revolved about an axis and for advancing said engaging member through an engaging stroke to engage the device when said engaging member is revolved, biasing means for retracting said engaging member,
  (b) linkage means for revolving said engaging member including a first link operatively connected to said engaging member, a second link threadably secured to said first link,
  (c) and wear adjuster means operatively associated with said biasing means responsive to an increased engaging stroke resulting from wear for turning one of said links on the other of said links with the motive force of said biasing means during device disengagement to advance said engaging member to compensate for the wear.

17. In a friction engaging device the combination comprising,
  (a) an engaging member, means for enabling said engaging member to be revolved about an axis and for advancing said engaging member through an engaging stroke to engage the device when said engaging member is revolved, spring means for retracting said engaging member, (b) linkage means for revolving said engaging member including a first link operatively connected to said engaging member, a second link threadably secured to said first link and prevented from turning on said first link, (c) and wear adjuster means responsive to an increased engaging stroke resulting from wear for turning said first link on said second link during device disengagement to advance said engaging member to compensate for the wear, said wear adjuster means including one-way clutch means operable to provide a one-way clutch connection between a stationary member and said first link for releasing said first link during the engaging stroke while at the same time sensing increase in the engaging stroke as a result of wear and for clutching said first link to said stationary member at device disengagement to turn said first link in its threaded engagement with said second link by the retracting movement of said engaging member so that the geometrical relationship in said linkage means is adjusted to effect the advancement of said engaging member to compensate for the wear.

18. The friction engaging device set forth in claim 17 and fluid motor means for advancing said engaging member through the engaging stroke.

19. The friction engaging device set forth in claim 17 and said one-way clutch means including sleeve means rotatably supported on said first link, a one-way acting clutch spring for clutching said first link to said sleeve means when said sleeve means is rotated in one direction only and said stationary member and said sleeve means having a lost motion connection permitting relative motion equal to the engaging stroke of said engaging member minus the movement required to engage said clutch spring for rotating said sleeve means in a direction opposite said one direction when an increase in the engaging stroke occurs during device engagement and in said one direction during subsequent device disengagement.

20. The friction engaging device set forth in claim 19 and said means for rotating said sleeve means including grooved abutment means providing a helical groove extending transverse to said axis, another abutment means abuttable with said slotted abutment means in said helical groove, one of said abutment means being fixed against movement in the device and the other of said abutment means being rigid with said sleeve means.

21. In a friction engaging device the combination comprising,
(a) an engaging member, means for enabling said engaging member to be revolved about an axis and for advancing said engaging member through an engaging stroke to engage the device when said engaging member is revolved,
(b) linkage means for revolving said engaging member including an apply arm, a nut threadably secured to said apply arm and engaging said engaging member,
(c) and wear adjuster means responsive to an increased engaging stroke resulting from wear for turning said nut in its threaded engagement with said apply arm to revolve said engaging member for advancement during device disengagement to compensate for the wear, said wear adjuster means including ratchet means associated with said nut and cam means for operating said ratchet means to turn said nut in response to the increased engaging stroke and only during subsequent device disengagement.

22. The friction engaging device set forth in claim 21 and fluid motor means for advancing said engaging means through the engaging stroke.

23. The friction engaging device set forth in claim 21 and said cam means including cam follower means operatively connected to said ratchet means and cam surface means fixed against movement in the device and providing a spiral cam surface extending transverse to said axis for said cam follower means to follow to operate said ratchet means.

24. The friction engaging device set forth in claim 23 and said ratchet means including a ratchet provided on said nut and a pawl carried by said cam follower means engageable with said ratchet for ratchet means operation to effect the wear compensation.

25. In a friction engaging device the combination comprising,
(a) an engaging member, means for enabling said engaging member to be revolved about an axis and for advancing said engaging member through an engaging stroke to engage the device when said engaging member is revolved,
(b) linkage means for revolving said engaging member including a cam assembly having a cam follower threadably secured to said engaging member,
(c) and wear adjuster means responsive to an increased engaging stroke resulting from wear for turning said cam follower in its threaded engagement with said engaging member to adjust the geometrical relationship in said linkage means only during subsequent device disengagement to advance said engaging member to compensate for the wear, said wear adjuster means including ratchet means associated with said cam follower and torque arm means for enabling said ratchet means to sense the increased engaging stroke during device engagement so that said ratchet means is conditioned at device disengagement to turn said cam follower for the wear compensation.

26. The friction engaging device set forth in claim 25 and fluid motor means for advancing said engaging means through the engaging stroke.

27. The friction engaging device set forth in claim 25 and said ratchet means including a ratchet secured to said cam follower and a ratchet member rotatably supported on said cam follower and supporting a pawl engageable with said ratchet.

28. The friction engaging device set forth in claim 27 and said torque arm means including a pin rigidly connected to said ratchet member and a pair of pins fixed against movement in the device and arranged to guide said first-mentioned pin.

References Cited

UNITED STATES PATENTS

| | | | |
|---|---|---|---|
| 2,889,896 | 6/1959 | Schultz et al. | 188—79.5 X |
| 3,106,268 | 10/1963 | Christenson et al. | 188—106 X |
| 3,110,364 | 11/1963 | Butler | 188—72 X |
| 3,211,263 | 10/1965 | Harrison | 188—72 X |
| 3,237,724 | 3/1966 | Kershner et al. | 188—106 X |

DUANE A. REGER, *Primary Examiner.*